United States Patent [19]

Parker

[11] 4,006,915
[45] Feb. 8, 1977

[54] CYCLE STEERING STABILIZER
[76] Inventor: C. William Parker, 53 Cedar St., Lynn, Mass. 01905
[22] Filed: Feb. 7, 1975
[21] Appl. No.: 547,871

Related U.S. Application Data

[63] Continuation-in-part of Ser. No. 364,627, May 29, 1973, abandoned.

[52] U.S. Cl. .............................................. 280/271
[51] Int. Cl.² ....................................... B62K 21/10
[58] Field of Search ................. 280/271, 272, 94

[56] References Cited

UNITED STATES PATENTS

| | | | |
|---|---|---|---|
| 410,335 | 9/1889 | Sanborn | 280/271 |
| 608,539 | 8/1898 | Barto | 280/271 |
| 1,230,801 | 6/1917 | Schriver | 280/271 |
| 3,393,919 | 7/1968 | Ragsddle et al. | 280/94 |

FOREIGN PATENTS OR APPLICATIONS

| | | | |
|---|---|---|---|
| 22,578 | 6/1948 | Finland | 280/271 |
| 8,932 | 1890 | United Kingdom | 280/271 |
| 5,835 | 1890 | United Kingdom | 280/271 |
| 871 | 1890 | United Kingdom | 280/271 |

*Primary Examiner*—Kenneth H. Betts
*Attorney, Agent, or Firm*—Thomas C. Stover, Jr.

[57] ABSTRACT

A stabilizing assembly is provided for bicycles having a collar mounted on a bicycle frame and a pair of clamps, each of which is on a separate branch of a front wheel steering means, the clamps each being connected to the collar by an adjustable tensed spring, which inhibits excess turning and jackknifing of the front wheel of the bicycle.

4 Claims, 7 Drawing Figures

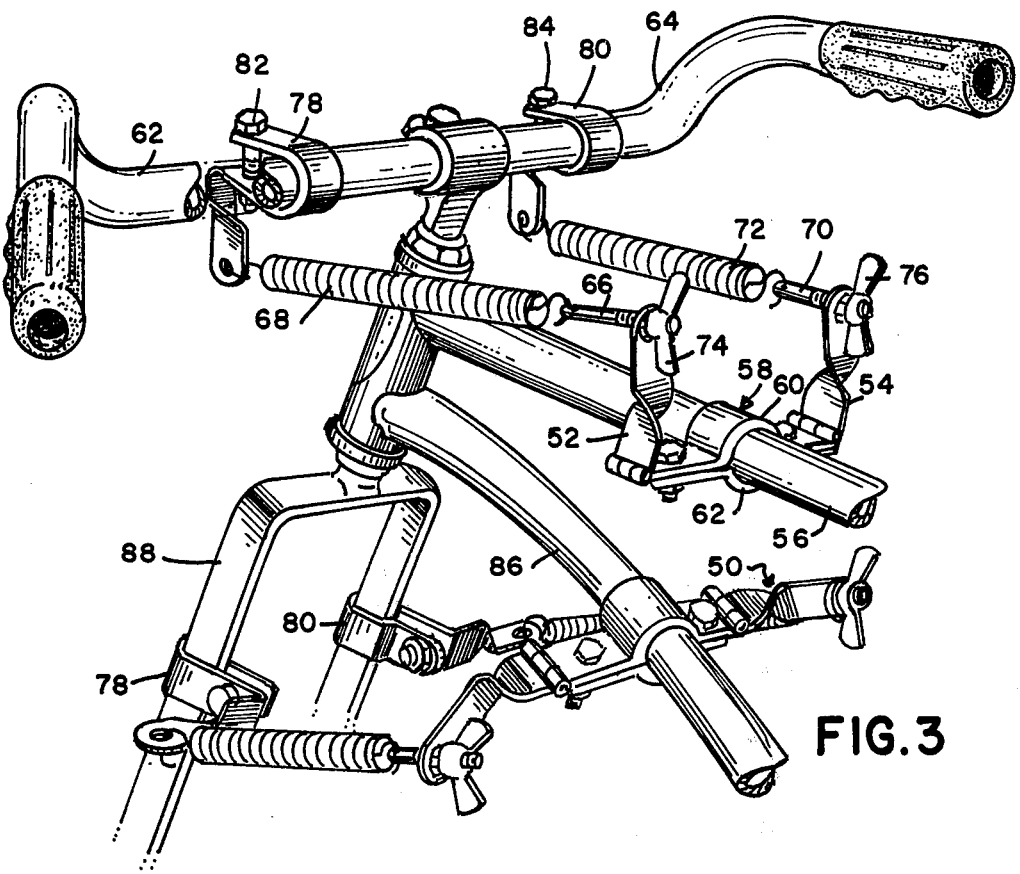
FIG. 3
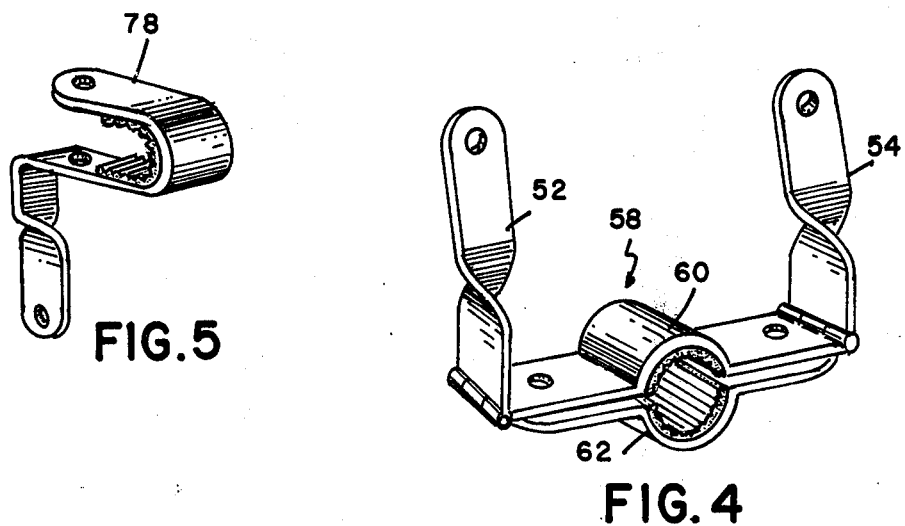
FIG. 5
FIG. 4

CYCLE STEERING STABILIZER

This application is a continuation-in-part of application Ser. No. 364,627 filed on May 29, 1973, now abandoned.

FIELD OF THE INVENTION

This invention relates to safety steering control for cycle vehicles, particularly stabilizing the front turning wheel of cycles.

THE PRIOR ART

Cycle vehicles, particularly tricycles and bicycles enjoy a widespread use, numbered in the millions, throughout the world. Bicycling is enjoying a renewed growth, particularly in the United States, as children and adults purchase these vehicles in increasing numbers for recreation and travel. However, cycles are not without their hazards, particularly in traffic areas where high incidence of, for example, bicycle collisions and spills occur and considerable effort has been expended by safety authorities and the bicycle industry to render these cycles safer. New design techniques have resulted in the introduction of the three, the five, the ten and even greater speed bicycles which renders the need for safety measures even more urgent.

One of the potential hazards in bicycling or tricycling or other cycling, for that matter, is the tendency of the steering wheel of the cycle to suddenly turn sharply to the right or to the left from the path of travel, to jackknife causing the vehicle to jolt to a stop or go out of control, throwing the rider forward and rendering collision imminent. Jackknifing is an ever-present danger in cycling no matter how experienced the rider; it can occur for examples, if the steering bars are released or the front wheel strikes an object or depression in the road or if the cyclist's attention is distracted. There is therefore a definite need and market for a means which could eliminate this ever-present threat to safe, unjury-free bicycling.

There has now been developed a means for preventing the jackknifing of the steering wheel of the cycles without impairing the steering capability thereof. Such steering stabilizing means or cycle control, designated herein as Cyc-Con, is adjustable to fit various cycles including bicycles and permit the steering wheel of the cycle full turning angle but prevent the excessive steering wheel turn angle that results in jackknifing, loss of control, spills and collisions of such cycle.

SUMMARY

There has now been discovered a safety steering control for cycles including bicycles, know herein as a steering stabilizer for cycles which comprises a frame clamp mountable on the frame of said cycle proximate the forward portion thereof, a pair of fork clamps, each clamp mountable on separate branch of the front wheel steering means of said cycle, said frame clamp having a pair of wings bent in opposed relationship to said fork clamps and tensable resilient means connecting respectively each fork clamp with its opposed wing of said frame clamp by contacting the respective bent wing portion at an angle therewith for restraining excessive turning and jackknifing of the front wheel of said cycle.

DESCRIPTION

These and other novel features will become apparent from the following detailed specification and drawings in which;

FIG. 3 is an isometric view of another cycle steering stabilizer embodying the present invention;

FIGS. 4 and 5 illustrate components of the embodiment shown in FIG. 3;

Figure 1:
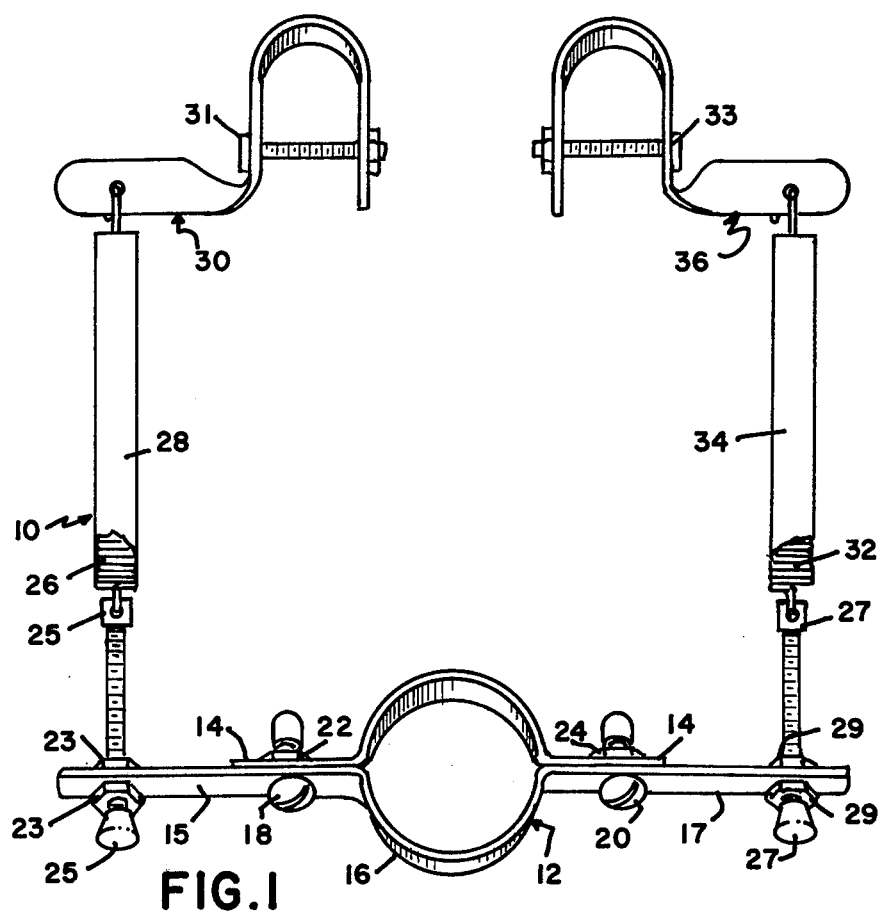
FIG. 1 is a plan view of the cycle steering stabilizer embodying the present invention.

Referring now to the drawings, cycle steering stabilizer 10 has frame clamp or collar 12, formed of two halves 14 and 16 joined by threaded bolts 18 and 20 and nuts 22 and 24 respectively as shown in FIG. 1. The frame clamp extension 15 is connected by resilient means 26 having plastic sleeve 28 to left steering wheel fork clamp 30 and the other frame collar extension 17 is connected by way of spring 32 housed in plastic sleeve 34, to right steering wheel fork clamp 36, as shown in FIG. 1. Threaded tension bolt 25 is attached to spring 26 and threaded tension bolt 27 is attached to spring 32 respectively and the bolts are advanced or withdrawn by rotation of nuts 23 and 29 for adjusting and equalizing the tensions of the respective springs 26 and 32 on the fork clamps thereon. The fork clamps 30 and 36 have as adjusting means, threaded bolts 31 and 33 respectively, all as shown in FIG. 1.

Figure 2:
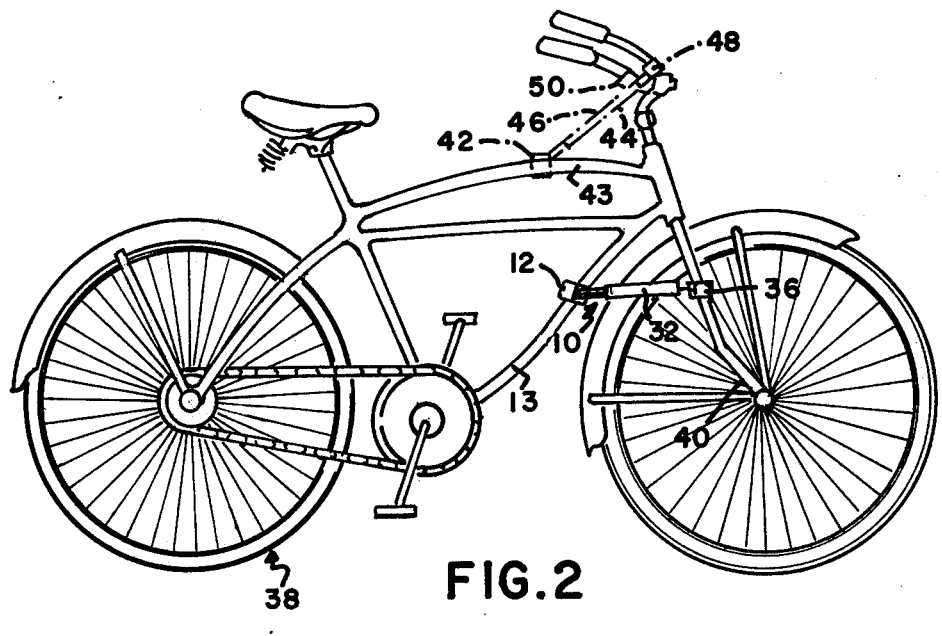
FIG. 2 is an elevation view of a bicycle illustrating the positioning of the cycle steering stabilizer embodying the invention thereon.

The cycle steering stabilizer is applied to a bicycle as follows: the frame clamp 12 is attached to the tubular bar frame 13 of bicycle 38 and the steering wheel fork clamp 36 is attached to steering wheel fork 40, while the other steering wheel fork clamp 30 is attached to the other steering wheel fork of the bicycle 38 (not shown), the frame clamp 12 and the fork clamps 30 and 36 being connected respectively by resilient tension means 26 and 32 as shown in FIG. 2.

In another embodiment also illustrated in phantom in FIG. 2, frame clamp 42 attached to bicycle frame bar 43 is connected by tensed resilient means 44 and 46 respectively to handle bar clamps 48 and 50 in place of cycle steering stabilizer 10.

In another embodiment, hinged cycle steering stabilizer 50 has hinged arms 52 and 54, which clamp on bicycle frame bar 56 by collar 58 formed of two bolt halves 60 and 62, as shown in FIG. 3. Hinged arms 52 and 54 are connected respectively to their respective handle bars 62 and 64 by threaded tension bolt 66 and helical spring 68 and by threaded tension bolt 70 and helical spring 72 as shown in FIG. 3. The tension bolts 66 and 70 are respectively advanced or withdrawn by rotation of the associated wing nuts 74 and 76, adjusting and equalizing the tensions of the respective springs 68 and 72 on the handle bars 62 and 64. The handle bar clamps 78 and 80 have as adjusting means, threaded bolts 82 and 84 as shown in FIGS. 3 and 5.

Similarly, the hingeable cycle steering stabilizer 50 can be clamped on the lower bicycle frame cross bar 86 and attached by clamp 78 and 80 to the bicycle steering fork 88, as shown in FIG. 3.

The stabilizer clamp portion 58 with arms 52 and 54 shown in FIG. 4, can be provided without hinging means for installation on the upper bicycle frame bar 56 in the upward extending position and inverted and clamped on the lower bicycle frame bar 86 in the downward extending position and accordingly attached to the bicycle handle or fork as indicated in FIG. 3 within the scope of the present invention.

Figure 6:
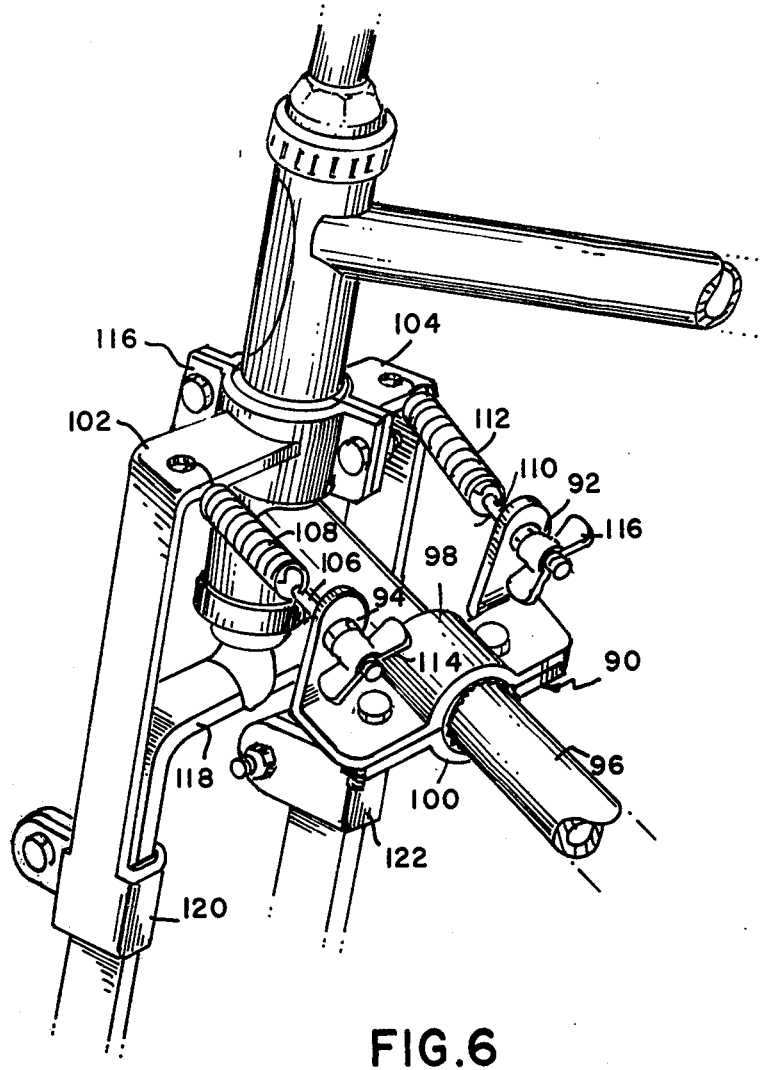
FIG. 6 is an isometric view of another cycle steering stabilizer embodying the invention.

In another embodiment of the present invention, cycle steering stabilizer 90 having upward extending arms 92 and 94, is clamped on bicycle frame bar 96 by bolted clamp halves 98 and 100 as shown in FIG. 6. The arms 92 and 94 are attached respectively to bicycle fork extension 102 and 104 by threaded tension bolt 106, helical spring 108 and threaded tension 110 and helical spring 112 respectively as shown in FIG. 6. The threaded bolts 106 and 110 are advanced or withdrawn by rotation of, respectively, wing nuts 114 and 116 for adjusting and equalizing the tensions of the respective springs 108 and 112 on said fork extension halves 102 and 104. The fork extension halves 102 and 104 are clamped together at bolted joints 116 and clamped to the fork 118 by fork extension clamp arms 120 and 122 as shown in FIG. 6.

In addition, the cycle steering stabilizer clamp 90 can be inverted on the bicycle frame bar 96 and the tension bolts 106 and 110 and their attached helical springs can be run directly to the adjacent halves of the bicycle fork 118.

Both of the above embodiments of FIGS. 3 through FIG. 6 have clamp arms which extend outward and then upwardly or downwardly out of the way of the knees of the bicycle operator. In the embodiment shown in FIGS. 3 to 5, the clamp arms 52 and 54 are hingeable and swing out of the way of the operator whether the clamp 58 is positioned on bicycle frame bar 56 or bar 86. In the case of the embodiment illustrated in FIG. 6, the clamp arms 94 and 92 extend upwardly or downwardly, with respect to the clamp 90, to again reduce the overall width of the cycle steering stabilizer and maintain it out of the way of the knees and arms of the bicycle operator.

Figure 7:
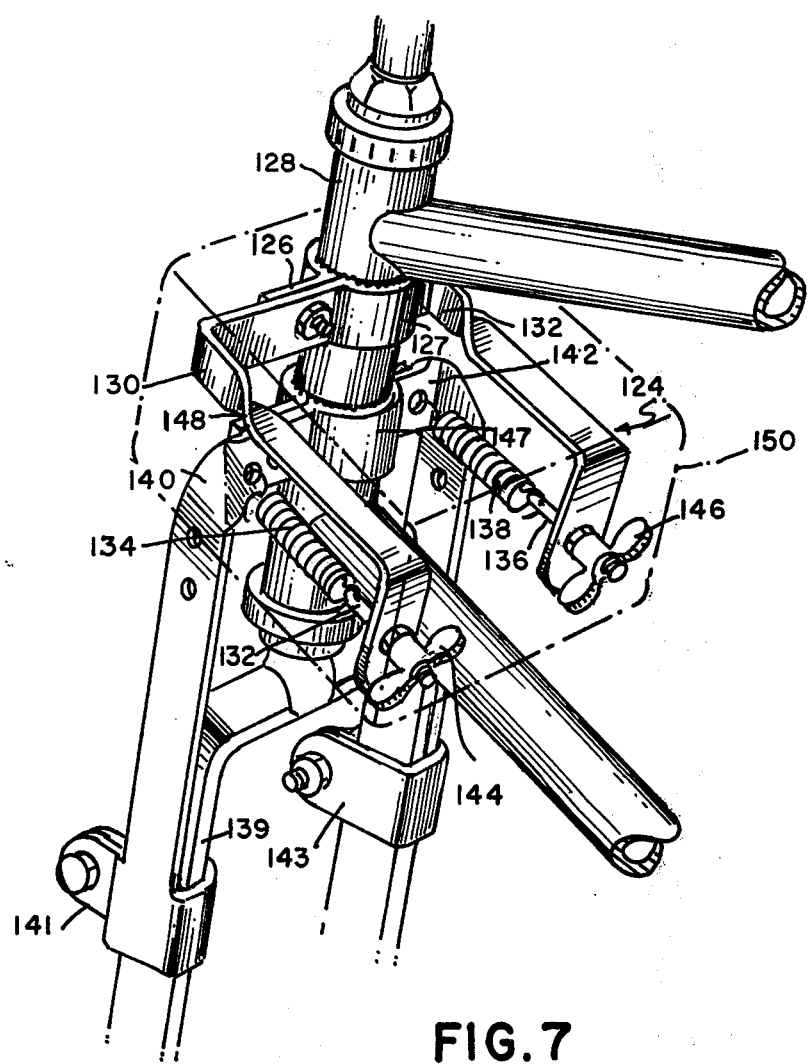
FIG. 7 is an isometric view illustrating yet another cycle steering stabilizer embodying the present invention.

In another embodiment of the invention, column mounted cycle steering stabilizer 124 is attached by column clamps 126 and 127 fixedly to the bicycle steering column 128 and supports stabilizer arms 130 and 132, which arms undergo a twist and a turn to support respectively, threaded tension bolts 132 and helical spring 134 and threaded tension bolt 136 and helical spring 138, which springs connect respectively to fork extension arms 140 and 142 as illustrated in FIG. 7. Again the tension in the respective springs 134 and 138 is adjusted by wing nuts 140 and 142 respectively. The fork extension halves 140 and 142 are joined at clamp 147 and 148, which is rotatably mounted on the steering column 128 and clamped to the bicycle fork 139 by fork clamps 141 and 143 respectively, as shown in FIG. 7.

In the embodiment of FIG. 7 the cycle steering stabilizer is mounted entirely free of the bicycle frame cross bars and is mounted on the steering column and can be positioned independently of any such bicycle frame cross bars in a compact and out of the way manner. In addition, the column mounted cycle steering stabilizer can be loosened at clamp 126 and rotated 180° so that extension arms 130 and 132 and associated wing nuts and tension bolts and springs project forward of the steering column within the scope of the present invention. Accordingly, the column mounted cycle steering stabilizer is preferred stabilizer of the present invention.

In the above embodiments the respective tension bolts are adjusted to attain a comfortable and equal tension on the resilient springs which connect the steering wheel fork or handle bars or fork extensions to the bicycle frame for ease of steering while obviating the threat of front wheel jackknifing.

From the above description, it can be seen that the cycle steering stabilizer of the present invention provides a ready and effective means to safely stabilize the steering wheel of a cycle while yet permitting ease of turning from the steering wheel when the cycler wishes to do so.

In addition, bicycle riding is made safer by the invention e.g. when a rider wishes to make a hand turn signal or button a jacket, the bicycle continues on a straight course under easy control of one hand.

The cycle steering stabilizer can be fashioned of rigid materials such as metal, plastic or wood. However, metal, e.g. steel for the clamps, the bolts and the springs is preferred. The resilient means is preferably a metal spring, however, one or more elastic bands can be substituted in place of each spring if desired. All of the above components can be coated with plastic or rubber materials and the like, particularly the clamps at the points of contact thereof with the cycle.

The spring sleeves, which can be mounted on all the embodiments discussed above, can be of plastic, rubber or other material or can be dispensed with if desired. Preferably, however, plastic sleeves are provided to protect the resilient means and can be preferably of polyolefin, polystyrene or other plastic material.

The means for adjusting the tension or the resilient means can be a threaded bolt as illustrated in FIG. 1, can include lever means, turnbuckles, or various other tension adjustment means as desired. In addition, the movement of the frame collar back and forth on the tubular frame and/or the movement of the fork clamps along the branches of their respective fork or handle bars will also serve to adjust the tension and the tension means by changing the distance between the frame and the fork clamps as desired.

The frame clamp can be positioned athwart the bicycle frame and has a pair of extended arms projecting outwardly from the frame so as to hold the resilient means connected thereto away from the bicycle fender and the front wheel as shown in FIGS. 1 and 2. However, the frame clamp need not have such extension arms since the resilient means can move back and forth within the sleeves provided therefor or where the frame clamp is connected to fork clamps on the handle bars on the cycle, no frame clamp extension arms are required.

The fork clamps can be employed with or without threaded bolts. Without such bolts the fork clamps are held in place by the tension arms and by friction.

In the embodiments shown in FIGS. 3 to 7, the wings of the frame clamps are bent to form compact units, out of the way of the bicycle operators limbs. Preferred is the stabilizer unit illustrated in FIG. 7 which is mounted on the cycle steering column.

The Cyc-Con safety steering stabilizer of the invention can be employed with cycles of all types including tricycles, bicycles, motor scooters, motorcycles and various other cycles, stronger and tenser resilient means being employed with the heavier cycles.

The stabilizer is desirably enclosed in a housing (eg. housing 150 FIG. 7) case, or shield eg. of plastic, rubber, metal, wood and the like or the protruding parts thereof are coated with resilient material eg. plastic, rubber, and the like for safety of the cycle operation or others coming in contact therewith.

What is claimed is:

1. A cycle steering stabilizer comprising a column clamp mountable on a fixed portion of the steering column frame of said cycle, said clamp having a pair of arms which extend rearwardly with respect to the long axis of said cycle on each side thereof, a pair of fork clamps, each clamp mountable on a separate branch of the front wheel steering means of said cycle and tensable resilient means connecting respectively each fork clamp with its opposed arm of said column clamp to restrain excessive turning and jackknifing of the steering wheel of said cycle.

2. The stabilizer of claim 1 wherein said fork clamps are mounted on the steering wheel fork of said cycle.

3. The stabilizer of claim 1 wherein said fork clamps are mounted on the steering wheel fork of said cycle and rotatably joined around said steering column frame below said frame clamp.

4. A cycle steering stabilizer comprising a frame clamp mountable on the frame of said cycle proximate the forward portion thereof, a pair of fork clamps, each clamp mountable on a separate branch of the front wheel steering means of said cycle, a pair of arms mounted on said frame clamp which arms bend on hinges having axes extending substantially longitudinally of said cycle, said arms being movable to positions in opposed relationship to said fork clamps and tensable resilient means connecting respectively each fork clamp with its opposed arm of said frame clamp for restraining excessive turning and jackknifing of the steering wheel of said cycle.

* * * * *